US009189332B1

(12) United States Patent
Moon et al.

(10) Patent No.: US 9,189,332 B1
(45) Date of Patent: Nov. 17, 2015

(54) PARITY DATA IN SOLID STATE MEMORY (71) Applicant: Seagate Technology LLC, Cupertino, CA (US)

(72) Inventors: John Edward Moon, Superior, CO (US); Stanton MacDonough Keeler, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 119 days.

(21) Appl. No.: 14/026,452

(22) Filed: Sep. 13, 2013

(51) Int. Cl.
*G06F 11/10* (2006.01)

(52) U.S. Cl.
CPC .................. *G06F 11/1068* (2013.01)

(58) Field of Classification Search
CPC ............ G06F 11/1048; G06F 11/1072; G06F 11/1008; G06F 11/108; G06F 12/0246; G06F 2212/1032; G06F 11/1068; G11C 29/04; G11C 29/52; G11C 7/1006; H04L 1/0057
USPC ............................. 714/E11.03, 718, 773, 801
See application file for complete search history.

(56) References Cited

U.S. PATENT DOCUMENTS

| 8,375,162 | B2 | 2/2013 | Allen | |
| 8,700,951 | B1* | 4/2014 | Call et al. | 714/6.24 |
| 8,799,474 | B2* | 8/2014 | Chatterton et al. | 709/226 |
| 2008/0065937 | A1 | 3/2008 | Micheloni | |
| 2011/0066793 | A1* | 3/2011 | Burd | 711/103 |
| 2011/0302477 | A1* | 12/2011 | Goss et al. | 714/773 |
| 2012/0151253 | A1* | 6/2012 | Horn | 714/6.22 |
| 2013/0031429 | A1* | 1/2013 | Sharon et al. | 714/718 |
| 2013/0242656 | A1* | 9/2013 | Sakaue et al. | 365/185.09 |
| 2014/0032992 | A1* | 1/2014 | Hara et al. | 714/773 |
| 2014/0164695 | A1* | 6/2014 | Sun et al. | 711/114 |

* cited by examiner

*Primary Examiner* — Phung M Chung
(74) *Attorney, Agent, or Firm* — Cesari & Reed LLP; Kirk A. Cesari (57) ABSTRACT A circuit may be configured to increase the data retention reliability of non-volatile solid state memory (NVSSM) by writing a parity block, which can contain user data pages and parity data pages. A circuit can also be configured to store the parity data pages based on whether the user data pages in the block have been filled, on elapsed time, or during a power down event.

17 Claims, 7 Drawing Sheets

PARITY DATA IN SOLID STATE MEMORY

BACKGROUND

The present disclosure generally relates to non-volatile data storage systems, such as NAND memory. Specifically, the present disclosure relates to improving data retention in solid state memory.

SUMMARY

An apparatus having a circuit configured to receive host data at a device including solid state memory. The circuit is further configured to store user data to the non-volatile solid state memory in a parity block containing multiple user data pages and a parity page. The circuit will generate parity data based on the multiple user data pages and store the parity data to at least one parity data page.

An apparatus having a process configured to process user data to be stored to a non-volatile solid state memory. The processor is further configured to store the user data in a parity block; the parity block having at least one user data page, at least one parity data page, and error-correcting code.

A method comprising storing user data to a solid state nonvolatile memory in a parity block containing user data pages and at least one parity data page, and filling the user data pages with pattern data when the parity block is not full. The method further comprises generating parity data based on the user data and storing the parity data to at least one parity page in the parity block.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure.

In some embodiments, non-volatile solid state memory (NVSSM) may be located on a silicon chip and can be found in devices such as hybrid disc drives, USB flash drives, mp3 players, and digital cameras. A property of NVSSM is its non-powered storage life span. Some NVSSM, such as flash memory, can store data bits via voltage across floating gates of an NVSSM cell, which can decay and may eventually fall below a threshold, invalidating data. It may be desirable to implement an error checking system, such as block based parity, before data on the cells are lost. Block based parity systems can consume large amounts of NVSSM storage space. Parity data in solid state memory may require relatively few parity pages for larger amounts of data than more traditional block based parity schemes, thus freeing more storage space for user data that would otherwise be used for parity data.

Figure 1:
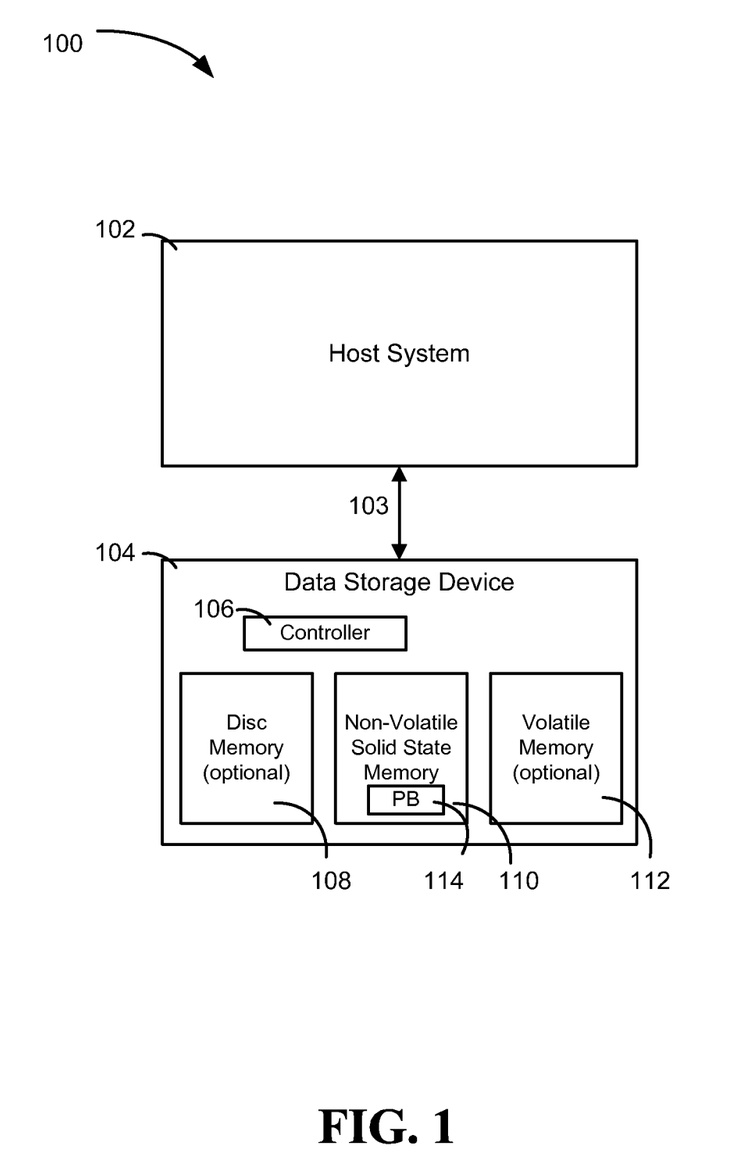
FIG. 1 is a diagram of parity data in solid state memory, in accordance with certain embodiments of the present disclosure.

Referring to FIG. 1, a diagram of parity data in solid state memory is shown and generally designated 100. In some systems, a host 102 may send data and commands via an interface 103 to a data storage device (DSD) 104. The DSD can be detachable and may be removed from the host. It can contain a controller 106, and may have one or more types of storage mediums, such as disc memory 108, non-volatile solid state memory (NVSSM) 110 (which may be NAND flash), or volatile memory 112. The interface 103 can include a connector, memory controller, or any combination thereof to implement communication protocols between the DSD 104 and the host 102. Further, the NVSSM 110 may contain a parity block (PB) 114 that can contain data and parity pages.

In some embodiments, the controller 106 can route user data to the NVSSM 114, which may be used as a cache for the disc memory 108 and may contain parity blocks comprised of parity and data pages.

Memory blocks in storage devices can be comprised of pages where each page can store data. In some embodiments, a memory block can have 32 pages, although in other embodiments, it can have more or less pages. A page can store a certain quantity of data, such as 2048 bytes, some of which can be error correction code (ECC); the remaining data may be user data, system data, or other types of data. ECC can be generated by firmware, hardware (such as a controller, microprocessor, etc.), or software, and can provided limited protection in the case of a data error in a page.

Some error protection methods can protect one or more pages in a memory block. In such a method, the pages in the memory block can be designated to store different types of data; user data and parity data. User data can be data received from a controller, a volatile memory, a NVSSM, a host, or other data source. Parity data can contain information necessary to restore user data in case of a data error in a page(s). The parity data can be calculated by software, firmware, or hardware such a controller. When a memory block is configured in such a manner, it can be called a parity block (block). A parity block can contain one or more parity pages.

Figure 2:
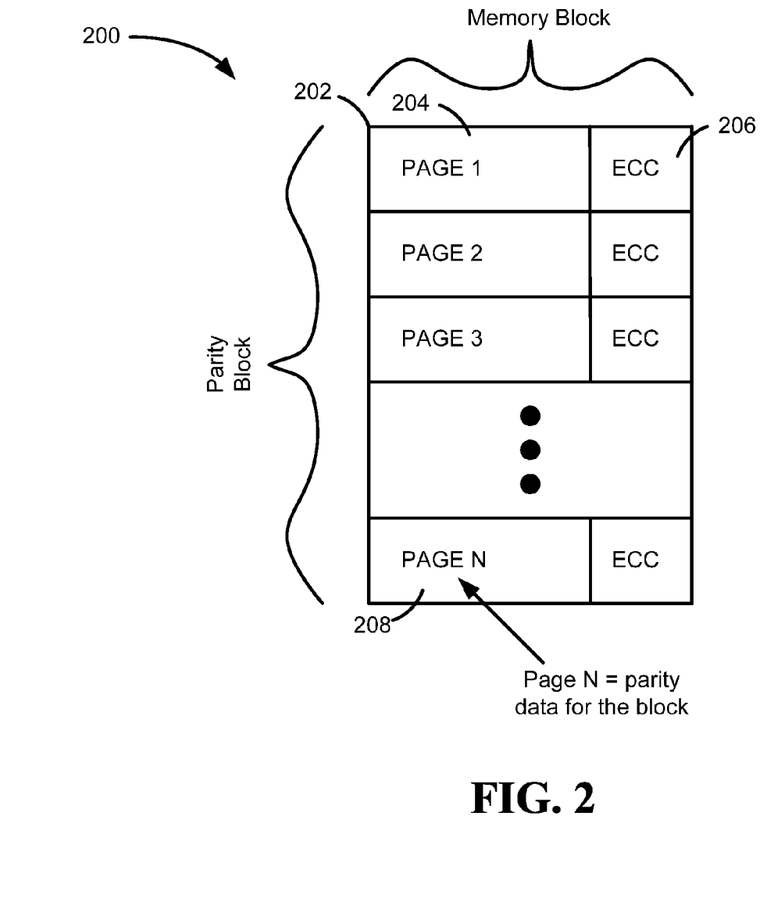
FIG. 2 is a diagram of parity data in solid state memory, in accordance with certain embodiments of the present disclosure.

Referring to FIG. 2, a diagram of parity data in solid state memory is shown and generally designated 200. The memory block 202 can have N pages of user data (or other non-parity data such as system data) 204 and one page of parity data 208. Each page of data can contain ECC 206. When a memory block is configured in a manner similar to 200, it can be called a parity block.

The memory 200 may be a memory device that allows data to be stored or programmed on a page basis; that is, page 1, page 2, page 3, etc. may be programmed separately. However, such a memory device may erase data on a memory block basis; that is, a whole memory block consisting of multiple pages may be required to be erased during a single erase operation. For example, flash memory can program data on a page basis and erase data on a memory block basis. Thus, in some embodiments of the memory 200, the parity block size may equal a memory block size, although such is not required. In other embodiments, a single memory block may have multiple parity blocks.

Figure 3:
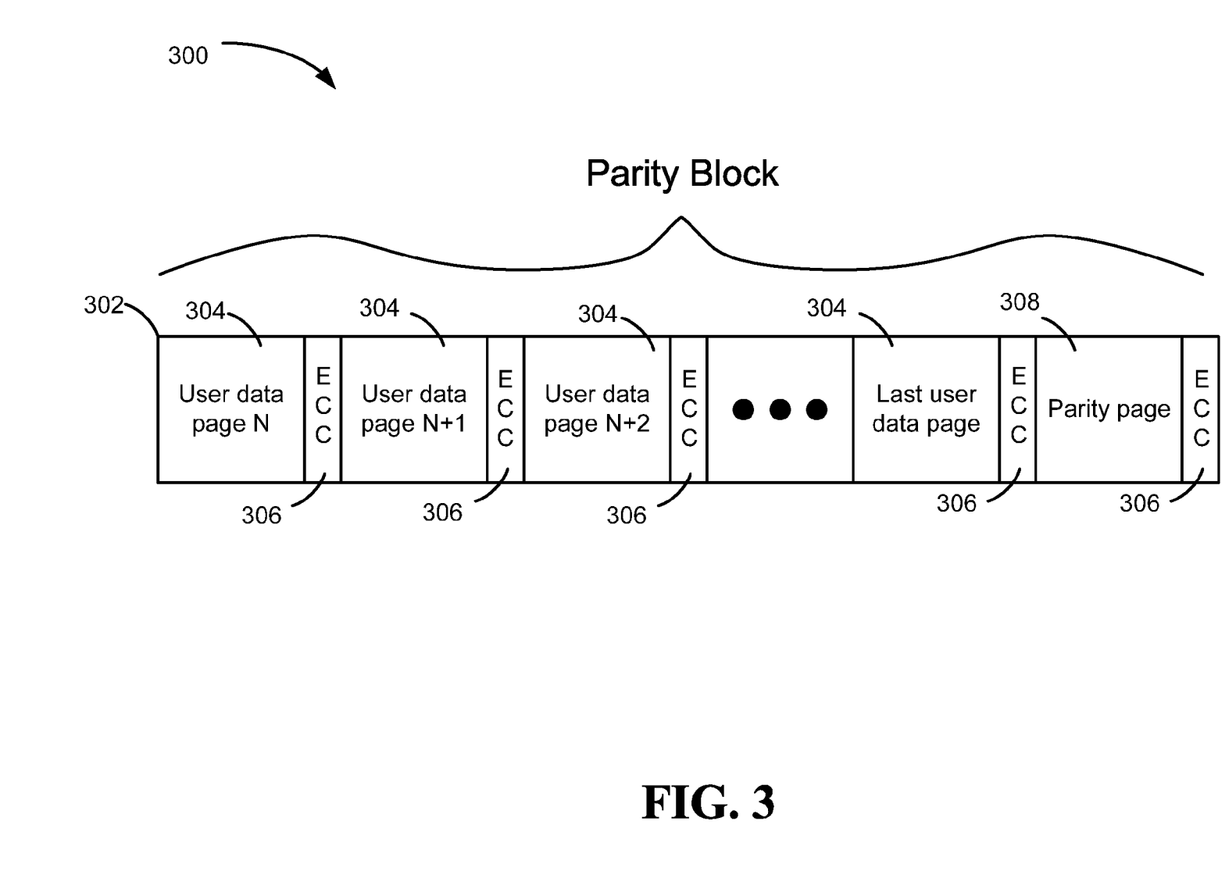
FIG. 3 is a diagram of parity data in solid state memory, in accordance with certain embodiments of the present disclosure.

FIG. 3 shows a diagram of parity data in solid state memory and is another representation of a parity block, generally designated 300. The parity block 302 can contain user data pages 304, a parity page 308, and accompanying ECC pages 306.

The data storage device (DSD) can restore the data in corrupt user data pages by combining the parity data in the parity page(s) with the data in the remaining valid user data pages. For example, consider an embodiment where a 128 page block contains four parity pages and 124 user data pages. When a user data page becomes corrupt, which can happen from time to time for various reasons, the DSD (or host) can restore the corrupt page using the data from the 123 valid data pages and the four parity pages.

One skilled in the art will recognize that the ratio of data versus parity data may be varied. For example, the strength of error correction chosen to be implemented in a system may determine the ratio of data versus parity data. In some examples, a parity block may have multiple pages of parity data.

Figure 4:
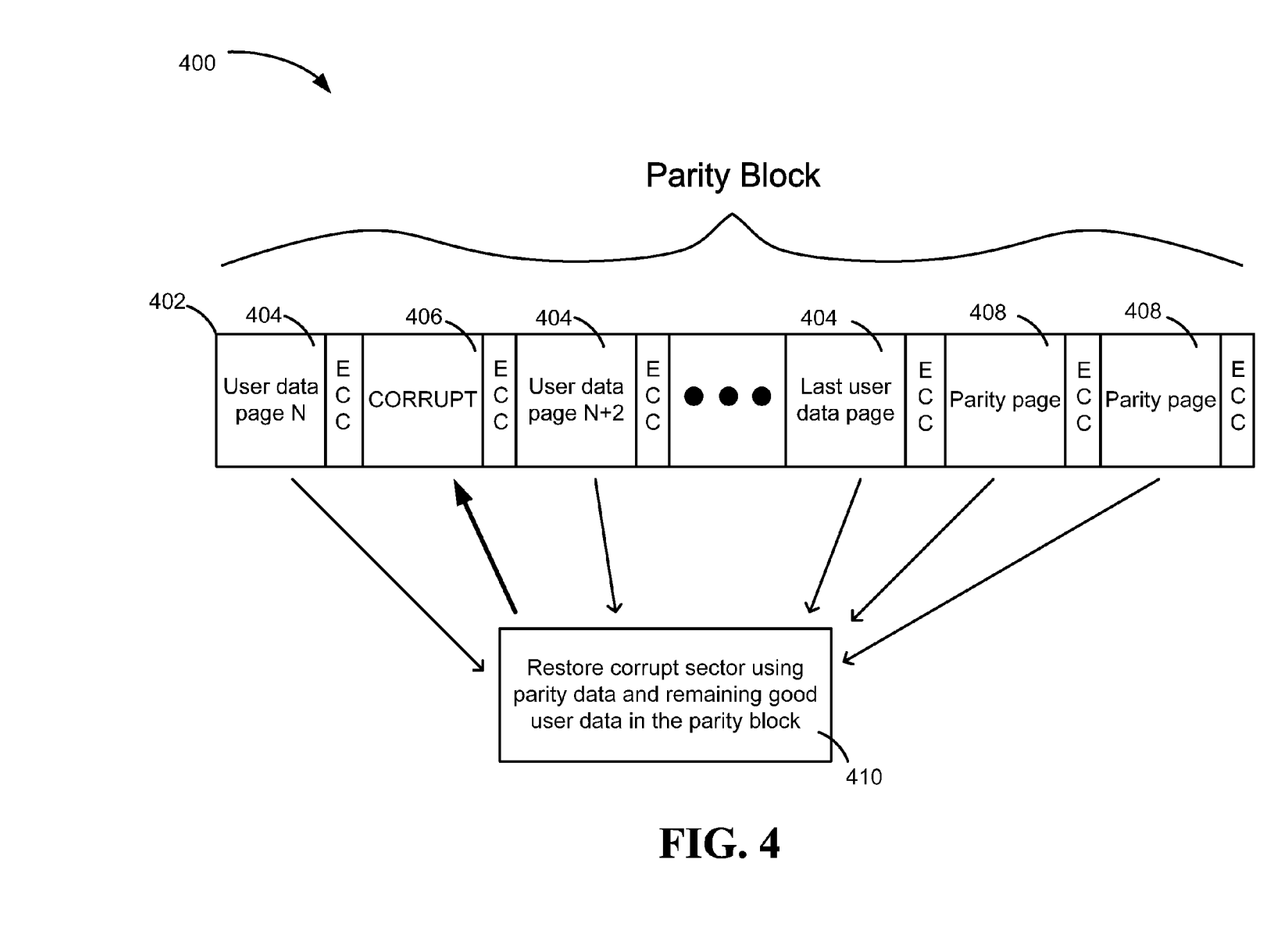
FIG. 4 is a diagram of parity data in solid state memory, in accordance with certain embodiments of the present disclosure.

Referring to FIG. 4, a diagram of an embodiment of parity data in solid state memory is shown and generally designated 400. A parity block 402 can contain a plurality of user data pages 404, and a corrupt user data page 406. The parity block 402 may also contain two parity data pages 406 which may contain parity data that can be used to restore corrupt user data pages. When an error occurs corrupting the page 406, the DSD can restore the corrupt data page 406 with data from the remaining valid user data pages 404 and from the parity pages 408 at 410.

A system implementing a parity block data protection system, such as described herein, may receive user data from a host and store it to an NVSSM. The size of the data can, in some embodiments, comprise a portion of a parity block, while in other embodiments the amount of user data may exceed the size of the block.

When a sufficient amount data is sent to the NVSSM such that the user data pages in the parity block are substantially full (which may be determined by a controller), the correction data in the parity pages can be calculated. In some embodiments, however, correction data can be calculated when the user data pages are less than substantially full.

A parity block can contain user data pages and parity data pages. User data may be stored in the user data pages, and when all the user data pages in the block are substantially filled, parity data can be generated and stored in the parity pages of the block. In some circumstances, the user data pages of the block may not be filled, and the controller (or in some embodiments, a host, firmware, software, etc.) can determine whether the parity block should continue to store user data, or whether the parity block should be finalized; a block may be finalized by filling the unused user data blocks (or portions thereof) with dummy data. In some embodiments, dummy data can be a fixed pattern or a random pattern. Parity data can then be generated and stored in parity pages.

Figure 5:
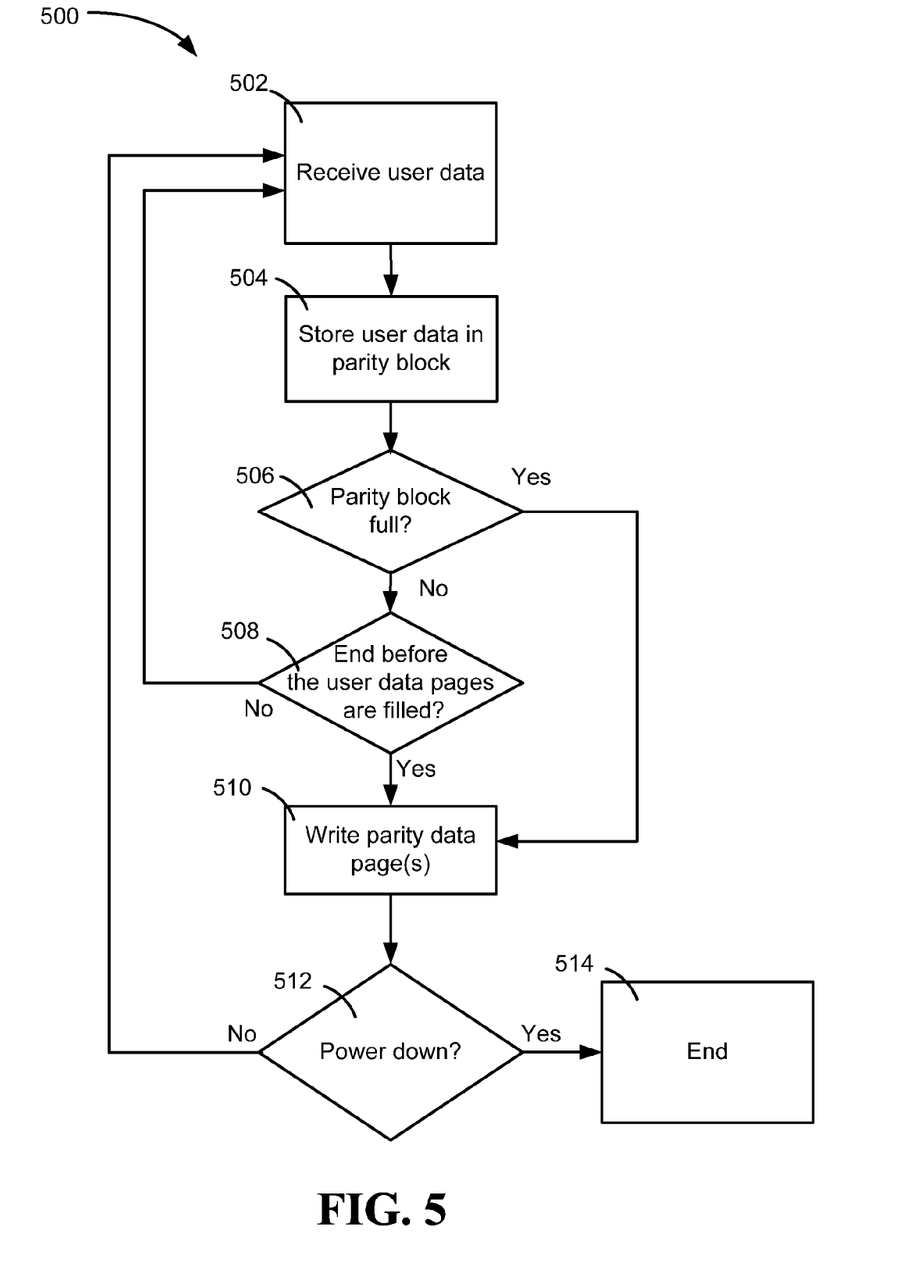
FIG. 5 is a flowchart of a method for use with parity data in solid state memory, in accordance with certain embodiments of the present disclosure.

Referring to FIG. 5, a flowchart of a method for parity data in solid state memory is shown and generally designated 500. The NVSSM can receive user data from a host at 502, and store the data in a parity block at 504. The controller can determine if all of the user data pages in the block are substantially filled at 506, and when the user data pages in the block are filled, parity data can be stored in the parity pages, at 508.

In the event that not all of the user data pages in the block are substantially full, at 506, the controller can determine when the block can receive more data and when it should be finalized, at 508. The block can be finalized in the event of a power down event or the expiration of a timer. In some embodiments, a finalization due to a power down event can be triggered by a command from the host or an indication from the controller. Once the parity block is finalized, the controller can stop accepting new data. When a timer has not expired and there has been no power down detected, the controller can continue to receive data at 502.

In some embodiments, the controller can determine if a power down event has occurred after the parity data is written to the parity pages, at 512. In some cases, a power down event may have occurred, or a power down command may have been issued after the check at 508, and a check at 512 can save time and reduce data risk by stopping the controller from receiving any further data. When there has been no power down event, the controller may continue to write user data to the block, at 502.

Figure 6:
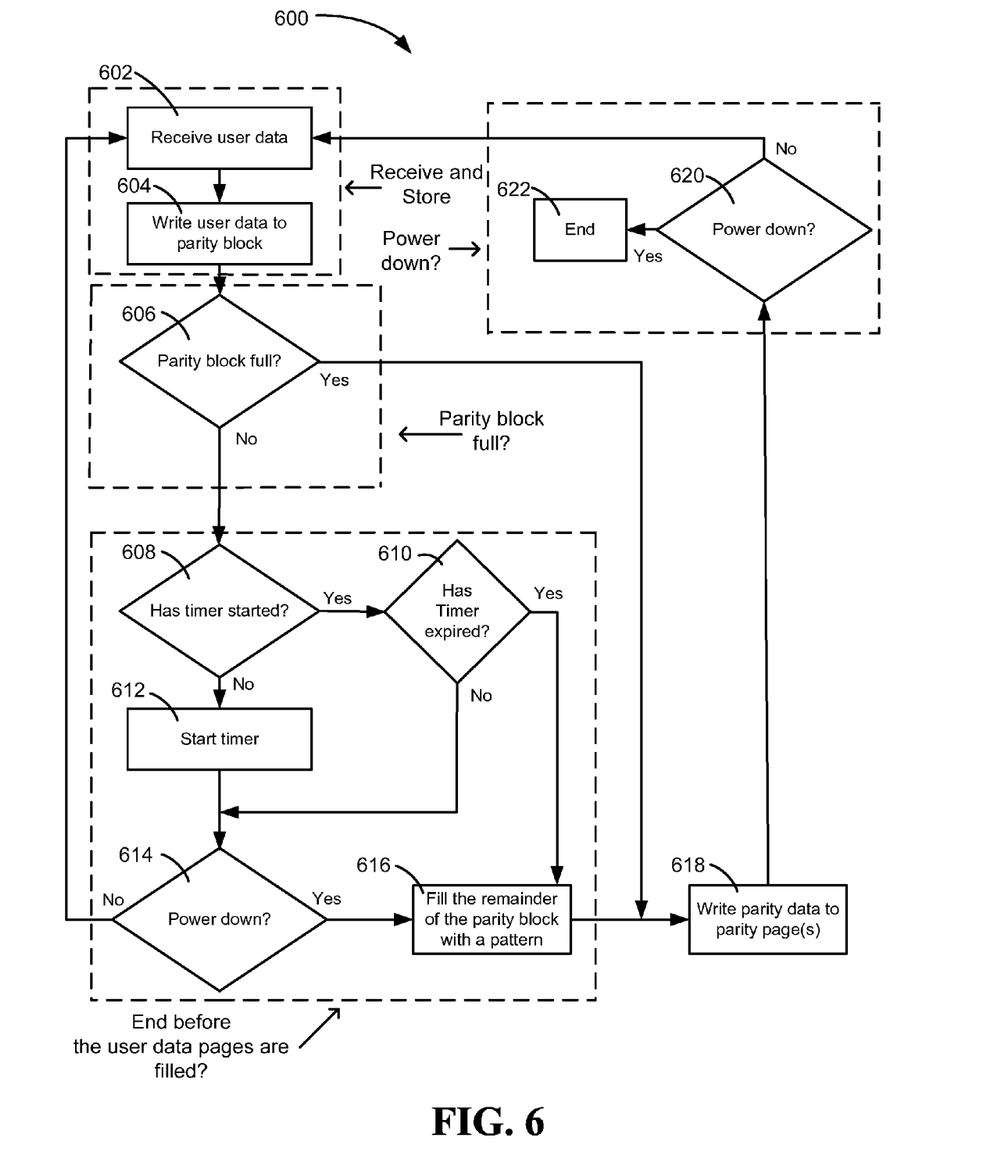
FIG. 6 is a flowchart of a method for use with parity data in solid state memory, in accordance with certain embodiments of the present disclosure.

Referring to FIG. 6, a flowchart of a method for parity data in solid state memory is shown and generally designated 600. The parity block can contain parity data pages and user data pages. The when the host (or other source) sends data to the NVSSM, data is written to the user data pages of a parity block. A parity block can contain multiple pages with at least one page reserved for parity data generated from the other pages of the parity block.

When the parity block has not yet been filled with user data, the controller can start a timer, the duration of which can be less than the non-powered storage lifespan of the NVSSM device (i.e. the point in time at which the floating gate voltage drops below a threshold beneath which the data can become invalid). The length of the timer can be calculated in many ways, and in some embodiments can be based on several parameters such as performance impact, parity capacity, and capability of the NVSSM technology.

A non-volatile solid state memory (NVSSM) can receive user data from a host at 602, and the data can be stored in the user data pages of a parity block at 604. When the parity block is full, parity data, which can be based off of the user data in the block, can be stored in the parity pages of the block, and in some embodiments, a final power down check can be performed at 620. When a final power down is detected at 620, the controller can stop receiving new user data at 622; otherwise, the NVSSM can receive data from the host at 602.

When the parity block is not full, the controller can determine if a timer has been started, at 608. When the timer has not been started, the controller can start the timer at 612. When a timer has started, the controller can determine if the timer has expired, in which case the block can be finalized at 616 and 618, and a final power down check can be performed at 620.

When the timer has been started but has not expired, the controller can determine if a power down event has occurred, at 614, and if so, the parity block can be finalized at 616 and 618. In some embodiments, the final power down check may not be performed. When there has been no power down event, such as a command from the host, the NVSSM can continue to receive data.

A parity block can contain multiple pages with at least one page reserved for parity data generated from the other pages of the parity block. In some embodiments, the number of data pages may be an integer multiple of the number of parity pages. For example, a parity block may contain four user data pages and one parity page. Over time, a source (such as a host or volatile memory) can send enough data to sufficiently fill all of the user data pages of the block. In situations where there is a power down, some of the user data pages may be comprised partially or fully of dummy data (pattern data) since the block may have been finalized before all of the user data pages could be filled with user data. There may be instances, however, where all of the data pages may be filled with user data. In some cases, a timer can expire before all of the user data sections could be filled with user data, in which case, the block can be finalized.

Figure 7:
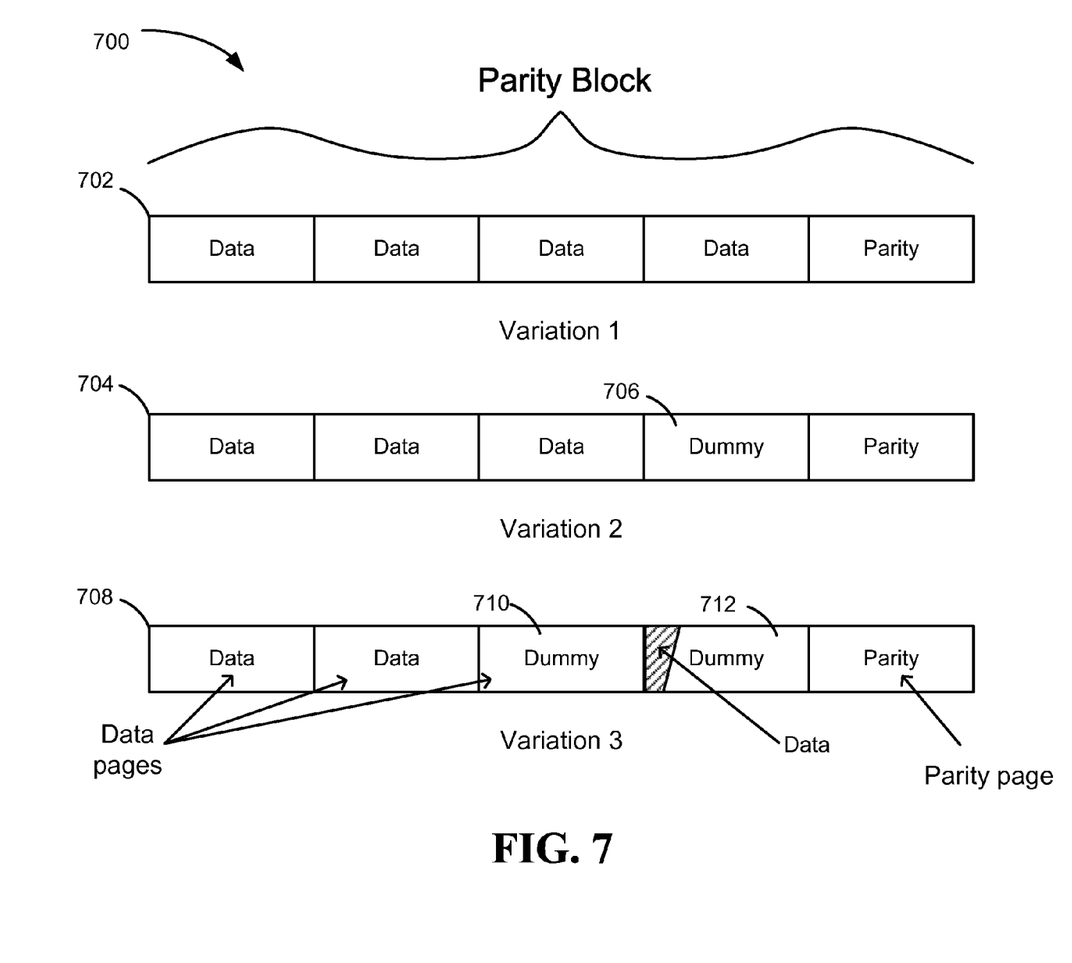
FIG. 7 is a diagram of parity data in solid state memory, in accordance with certain embodiments of the present disclosure.

Referring to FIG. 7, a diagram of parity data in solid state memory is shown and generally designated 700. In the embodiments of 700, a parity block is shown with several different content variations. The parity block 702, 704, and 708, can contain four user data pages and one parity data page. For purposes of example, the parity block in the different variations can be finalized.

In the embodiment of variation one 702, the user data pages may be sufficiently filled with valid user data. In other embodiments, such as those illustrated in variations 704 and 708, the user data pages may be filled (706 and 710) or partially filled (712) with dummy data. Dummy data can be written to unfilled areas of user data pages so that the parity block can be finalized before the user data pages can be substantially filled with valid user data. The need to finalize a block before the user data pages are substantially filled can arise because of a power down event or the expiration of a timer, or for other reasons that could require a cessation of NVSSM writing.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to:
   receive host data at a device including a nonvolatile solid state memory;
   store user data to the nonvolatile solid state memory in a parity block including multiple user data pages and a parity data page;
   generate parity data based on the multiple user data pages; and
   determine if the parity data should be written to the parity page when the user data pages are not substantially full based on at least one of reception of a power down command from a host and expiration of a timer associated with a non-powered storage lifespan of a storage associated with the device.

2. The apparatus of claim 1 further comprising the circuit configured to:
   store the parity data to the parity data page when the user data pages of the parity block are substantially full.

3. The apparatus of claim 2 further comprising the circuit configured to:
   fill unused space in the user data pages with pattern data and generate the parity data when the circuit determines the parity data should be written to the parity data page even though the user data pages are not substantially full; and
   store the parity data to the parity data page when the user data pages have been substantially filled with pattern data.

4. The apparatus of claim 3 further comprising the circuit configured to:
   initiate filling the unused space when the timer expires.

5. The apparatus of claim 3 further comprising the circuit configured to:
   initiate filling the unused space when the power down command is received.

6. The apparatus of claim 3 further comprising the circuit configured to:
   restore user data pages containing erroneous data based on data from valid user data pages and data from the at least one parity page.

7. The apparatus of claim 1 further comprising the user data pages and the parity data page each store data for error correcting code (ECC).

8. The apparatus of claim 1 further comprising the parity block contains multiple pages, and the number of user data pages is an integer multiple of a number of parity pages of the parity block.

9. An apparatus comprising:
a processor configured to:
process user data to be stored to a non-volatile solid state memory;
store the user data to the non-volatile solid state memory in a parity block having:
   at least one user data page for storing the user data;
   at least one parity data page for storing parity data associated with the user data; and
   error-correcting code for data error protection in a page of the parity block;
generate the parity data based on the user data; and
fill unused space in the at least one user data page with pattern data and generate the parity data when the processor determines parity data should be written to the parity page with the at least one user data page not substantially full of the user data based on a reception of a power down command from a host.

10. The apparatus of claim 9 further comprising the processor configured to:
store the parity data to the parity block when the at least one user data page has been substantially filled with patterned data.

11. The apparatus of claim 10 further comprising the processor configured to:
start a timer when one of the at least one user data page in the parity block is not substantially full; and
store the pattern data to one of the at least one user data page not substantially filled with user data when the timer has expired.

12. The apparatus of claim 10 further comprising the circuit configured to:
restore a user data page containing erroneous data using user data pages containing valid data and one of the at least one parity data page.

13. A method comprising:
storing user data to a solid state nonvolatile memory in a parity block including user data pages and at least one parity data page;
filling the user data pages with pattern data when the parity block is not substantially full;
generating parity data based on the user data and storing the parity data to one of the at least one parity data page in the parity block; and
determining if the parity data should be written to the at least one parity page with the user data pages not substantially full based on expiration of a timer indicating a non-powered storage lifespan of the solid state nonvolatile memory.

14. The method of claim 13 further comprising:
storing new user data to the parity block; and
determining when the user data pages of the parity block are substantially full.

15. The method of claim 13 further comprising:
starting the timer when the user data pages in the parity block are not substantially full;
filling unused space in the user data pages with pattern data and generating the parity data based on expiration of the timer; and
storing the parity data to the parity block when the user data pages have been substantially filled with the pattern data.

16. The method of claim 15 further comprising:
storing the parity data to the parity data pages when a timer has expired; and
storing the parity data to the at least one parity data page upon a power down indication.

17. The method of claim 16 further comprising:
restoring user data pages containing erroneous data using user data pages storing valid data and the at least one parity page.

\* \* \* \* \*